(12) United States Patent  
Cooke et al.

(10) Patent No.: US 7,945,135 B2  
(45) Date of Patent: May 17, 2011

(54) TELESCOPING FIBER OPTIC MODULE AND RELATED EQUIPMENT

(75) Inventors: Terry L. Cooke, Hickory, NC (US); David L. Dean, Jr., Hickory, NC (US); Jose Arturo Urdiales Gonzalez, Reynosa (MX); Tory A. Klavuhn, Newton, NC (US); Manuel Alejandro Lopez Sanchez, Reynosa (MX); Harley J. Staber, Coppell, TX (US)

(73) Assignee: Corning Cable Systems LLC, Hickory, NC (US)

( * ) Notice: Subject to any disclaimer, the term of this patent is extended or adjusted under 35 U.S.C. 154(b) by 27 days.

(21) Appl. No.: 12/415,253

(22) Filed: Mar. 31, 2009

(65) Prior Publication Data

US 2010/0054685 A1   Mar. 4, 2010

Related U.S. Application Data

(60) Provisional application No. 61/197,068, filed on Oct. 23, 2008, provisional application No. 61/190,538, filed on Aug. 29, 2008.

(51) Int. Cl.
*G02B 6/00* (2006.01)

(52) U.S. Cl. .................................................. 385/135

(58) Field of Classification Search .................. 385/134, 385/135
See application file for complete search history.

(56) References Cited

U.S. PATENT DOCUMENTS

| | | | | |
|---|---|---|---|---|
| 5,017,211 A | 5/1991 | Wenger et al. | | 71/92 |
| 5,127,082 A | 6/1992 | Below et al. | | 385/135 |
| 5,167,001 A | 11/1992 | Debortoli et al. | | 385/135 |
| 5,497,444 A | 3/1996 | Wheeler | | 385/135 |
| 6,584,267 B1 * | 6/2003 | Caveney et al. | | 385/134 |
| 6,591,051 B2 | 7/2003 | Solheid et al. | | 385/134 |
| 6,647,197 B1 | 11/2003 | Marrs et al. | | 385/134 |
| 6,920,274 B2 | 7/2005 | Rapp et al. | | 385/135 |
| 7,391,952 B1 | 6/2008 | Ugolini et al. | | 385/135 |
| 7,397,996 B2 * | 7/2008 | Herzog et al. | | 385/135 |
| 2005/0111809 A1 | 5/2005 | Giraud et al. | | 385/135 |
| 2006/0018622 A1 | 1/2006 | Caveney et al. | | 385/135 |
| 2008/0175551 A1 | 7/2008 | Smrha et al. | | 385/135 |
| 2008/0175552 A1 | 7/2008 | Smrha et al. | | 385/135 |
| 2008/0247723 A1 | 10/2008 | Herzog et al. | | 385/135 |

FOREIGN PATENT DOCUMENTS

| | | |
|---|---|---|
| DE | 8711970 | 10/1987 |
| EP | 0408266 | 1/1991 |
| EP | 0529830 | 3/1993 |

* cited by examiner

*Primary Examiner* — Jerry T Rahll

(74) *Attorney, Agent, or Firm* — Michael E. Carroll, Jr.

(57) ABSTRACT

Embodiments disclosed in the detailed description include a telescoping fiber optic module. The telescoping fiber optic module may be provided in a fiber optic equipment chassis which may be disposed in an equipment rack to support fiber optic connections. In embodiments disclosed herein, the telescoping fiber optic module is comprised of a fixed housing portion having an opening on a front side defining a passage inside the fixed housing portion. The fiber optic module is also comprised of a telescoping portion received in the passage inside the fixed housing portion. In this manner, the telescoping portion can telescope in and out of the fixed housing portion. This allows fiber optic connectors or adapters disposed in the telescoping portion and any connections made thereto to be telescoped out for improved access and telescoped back into the fixed housing portion when access is no longer needed.

27 Claims, 17 Drawing Sheets

TELESCOPING FIBER OPTIC MODULE AND RELATED EQUIPMENT

RELATED APPLICATIONS

The present application claims priority to U.S. Provisional Patent Application Ser. No. 61/197,068, filed Oct. 23, 2008, titled "High Density Data Center Hardware Assemblies, and Components," which is incorporated herein by reference in its entirety.

The present application also claims priority to U.S. Provisional Patent Application Ser. No. 61/190,538, filed Aug. 29, 2008, titled "High Density Data Center Hardware Assemblies, and Components," which is incorporated herein by reference in its entirety.

BACKGROUND

1. Field of the Disclosure

The technology of the disclosure relates to fiber optic modules that enable fiber optic connections and related equipment and assemblies.

2. Technical Background

Benefits of optical fiber use include extremely wide bandwidth and low noise operation. Because of these advantages, optical fiber is increasingly being used for a variety of applications, including but not limited to broadband voice, video, and data transmission. Fiber optic networks employing optical fibers are being developed and used to deliver voice, video, and data transmissions to subscribers over both private and public networks. These fiber optic networks often include separated connection points at which it is necessary to link optical fibers in order to provide "live fiber" from one connection point to another connection point. In this regard, fiber optic equipment is located in data distribution centers or central offices to support interconnections.

Due to increasing bandwidth needs and the need to provide high connectivity density in data centers for increased revenue generating opportunities, fiber optic networks are migrating to higher cable fiber counts. Multi-fiber cables are used to provide higher cable fiber counts and are used for trunk connections in a fiber optic network. Higher density fiber optic modules containing a larger number of fiber optic connections can be provided to support high density cables and connectivity. However, trunk cable management for higher density fiber optic modules becomes more difficult due to the increase in fiber count. Also, optical components and connections in higher density modules may be more difficult to access when establishing and modifying connections as well when cleaning connectors. Due to these access issues, the fiber optic modules may be removed from a chassis before making or modifying connections or cleaning connectors.

To facilitate access and removal, fiber optic modules have been provided that can be removed from a chassis. These fiber optic modules may be mounted in a chassis or mounted to a pull out module tray that is mounted in a chassis. In either configuration, the fiber optic module can be removed from the chassis for access. Any trunk furcations connected to the back side of the fiber optic module are also pulled as a result of removing a fiber optic module out of the chassis. However, when the fiber optic module is reinstalled after removal, the technician cannot generally see the trunk furcations connected to the back side of the fiber optic module. Thus, the replacing the fiber optic module back into the chassis could kink and attenuate or otherwise impair the trunk furcations connected to the fiber optic module. Pushing the trunk furcations back into the chassis could also disturb other trunk furcations in the chassis thereby attenuating or other impairing those trunk furcations as well. Thus, there is a need in the art for a module that allows access without the associated problems of the prior art.

SUMMARY OF THE DETAILED DESCRIPTION

Embodiments disclosed in the detailed description include telescoping fiber optic modules. The telescoping fiber optic modules may be provided in a fiber optic equipment chassis which may be disposed in an equipment rack to support fiber optic connections. The telescoping fiber optic modules are comprised of a fixed housing portion and a telescoping portion. The telescoping portion may contain fiber optic adaptors and/or connectors for establishing fiber optic connections. The fixed housing portion remains fixed in the chassis while the telescoping portion can translate outward to the front side of the module and/or chassis. In this manner, any cable or trunk furcations connected to the back side of the telescoping fiber optic module are inhibited from moving (i.e., are fixed) when the telescoping portion is translated out from the chassis for access or removal. Likewise, the cable or trunk furcations are also not disturbed (i.e., moved) when the telescoping portion is translated back into the fixed housing portion and the chassis.

In embodiments disclosed herein, the telescoping fiber optic module is comprised of a fixed housing portion that has an opening on a front side defining a passage inside the fixed housing portion. The telescoping fiber optic module is also comprised of a telescoping portion received in the passage inside the fixed housing portion. In this manner, the telescoping portion can telescope in and out of the fixed housing portion and the chassis in which the fixed housing portion is installed. The telescoping portion may contain fiber optic connectors from a cable harness connected to fiber optic adapters disposed in the telescoping portion. The cable harness establishes fiber optic connections with one or more trunk furcations connected to the back side of the fixed housing portion.

Additional features and advantages of the invention will be set forth in the detailed description which follows, and in part will be readily apparent to those skilled in the art from that description or recognized by practicing the invention as described herein, including the detailed description that follows, the claims, as well as the appended drawings.

It is to be understood that both the foregoing general description and the following detailed description present embodiments of the invention, and are intended to provide an overview or framework for understanding the nature and character of the invention as it is claimed. The accompanying drawings are included to provide a further understanding of the invention, and are incorporated into and constitute a part of this specification. The drawings illustrate various embodiments of the invention, and together with the description serve to explain the principles and operation of the invention.

DETAILED DESCRIPTION OF THE PREFERRED EMBODIMENTS

Reference will now be made in detail to the preferred embodiments of the present invention, examples of which are illustrated in the accompanying drawings, in which some, but not all embodiments of the invention are shown. Indeed, the invention may be embodied in many different forms and should not be construed as limited to the embodiments set forth herein; rather, these embodiments are provided so that this disclosure will satisfy applicable legal requirements. Whenever possible, like reference numbers will be used to refer to like components or parts.

Embodiments disclosed in the detailed description include telescoping fiber optic modules. The telescoping fiber optic modules may be provided in a fiber optic equipment chassis which may be disposed in an equipment rack to support fiber optic connections. The telescoping fiber optic modules are comprised of a fixed housing portion and a telescoping portion. The telescoping portion may contain fiber optic connectors for establishing fiber optic connections. The fixed housing portion remains fixed in the chassis while the telescoping portion can translate about the chassis. Consequently, any cable or trunk furcations connected to the back side of the telescoping fiber optic module advantageously are inhibited from moving when the telescoping portion is translated out from the chassis and/or module for access or removal. Likewise, the cable or trunk furcations are also not disturbed (i.e., moved) when the telescoping portion is translated back into the fixed housing portion and the chassis.

Figure 1:
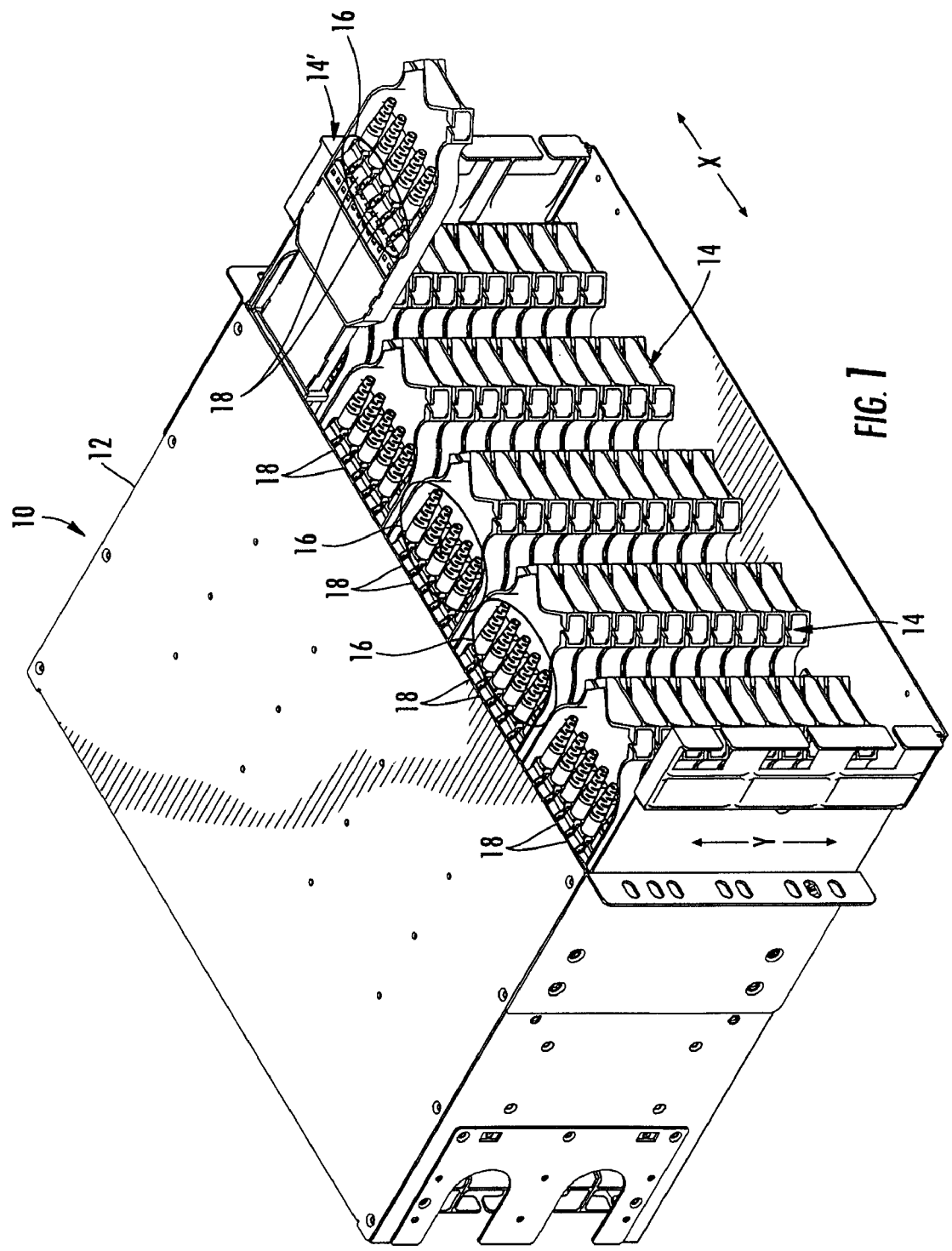
FIG. 1 is a front perspective view of an explanatory fiber optic equipment chassis holding telescoping fiber optic modules according to one embodiment.

In this regard, FIG. 1 illustrates a front perspective view of explanatory fiber optic equipment 10 configured to support one or more telescoping fiber optic modules according to one embodiment. As illustrated in FIG. 1, the fiber optic equipment 10 in this example is provided in the form of a fiber optic equipment chassis 12 ("chassis 12"). One or more telescoping fiber optic modules 14 are installed in the chassis 12 in one or more rows to provide fiber optic connections. Although each of the telescoping fiber optic modules 14 can telescope out from the chassis 12, one telescoping fiber optic module 14' is illustrated telescoped out from the chassis 12. As will be discussed in greater detail below, the ability of the telescoping fiber optic modules 14 to telescope out from the chassis 12 provide enhanced access to fiber optic connectors 16 provided therein. Additionally, the routing of cables at the rear portion of the module is not disturbed. Telescoping means that a component of a fiber optic module containing one or more fiber optic connectivity components, including but not limited to fiber optic connectors or adapters, can move (i.e., slide in and out) with respect to a fixed portion of the fiber optic module that also includes a fiber optic connectivity component. More detail regarding the telescoping fiber optic modules 14 illustrated in FIG. 1 will be described below in this application.

In this example, the chassis 12 is a 4-U size chassis, wherein "U" equals a standard 1.75 inches in height. However, any suitable height is possible such as a 1-U chassis or the like. The chassis 12 may be installed in a fiber optic equipment rack (not shown) provided at a data distribution center, central office, or other suitable location to support fiber optic equipment. This includes telescoping fiber optic modules 14, as exemplified herein, to support and manage fiber optic connections. As shown, the chassis 12 supports telescoping fiber optic modules 14 each containing six (6) duplex LC fiber optic adapters 18 to provide a total of twelve (12) optical fiber connections per module, but other arrangements/densities are possible. By way of example, any fiber optic connector type may be employed in the telescoping fiber optic modules 14, including but not limited to LC, SC, ST, LCAPC, SCAPC, MTRJ, and FC fiber optic connector types. Likewise, any optical fiber count may be supported by the telescoping fiber optic module 14, including but not limited to twelve (12), twenty-four (24), thirty-six (36), and forty-eight (48). As shown, chassis 12 is configured to support up to fifty (50) telescoping fiber optic modules 14 (i.e., five (5) modules in the horizontal or x-axis by ten (10) modules in the vertical or y-axis), but other arrangements are possible. Thus, the chassis 12 is configured to support up to six hundred (600) optical fiber connections (i.e., fifty (50) telescoping fiber optic modules 14 modules times twelve (12) optical fiber connections) in the 4-U size. If the chassis 12 has four modules in the horizontal direction the density is then four-hundred and eighty (480) optical fiber connections. Although the term "high density" is not limited to any specific optical fiber count, the chassis 12 as populated with telescoping fiber optic modules 14 illustrated in FIG. 1 may be thought of as high density fiber optic equipment given the number of optical fiber connections possible.

Figure 2A:
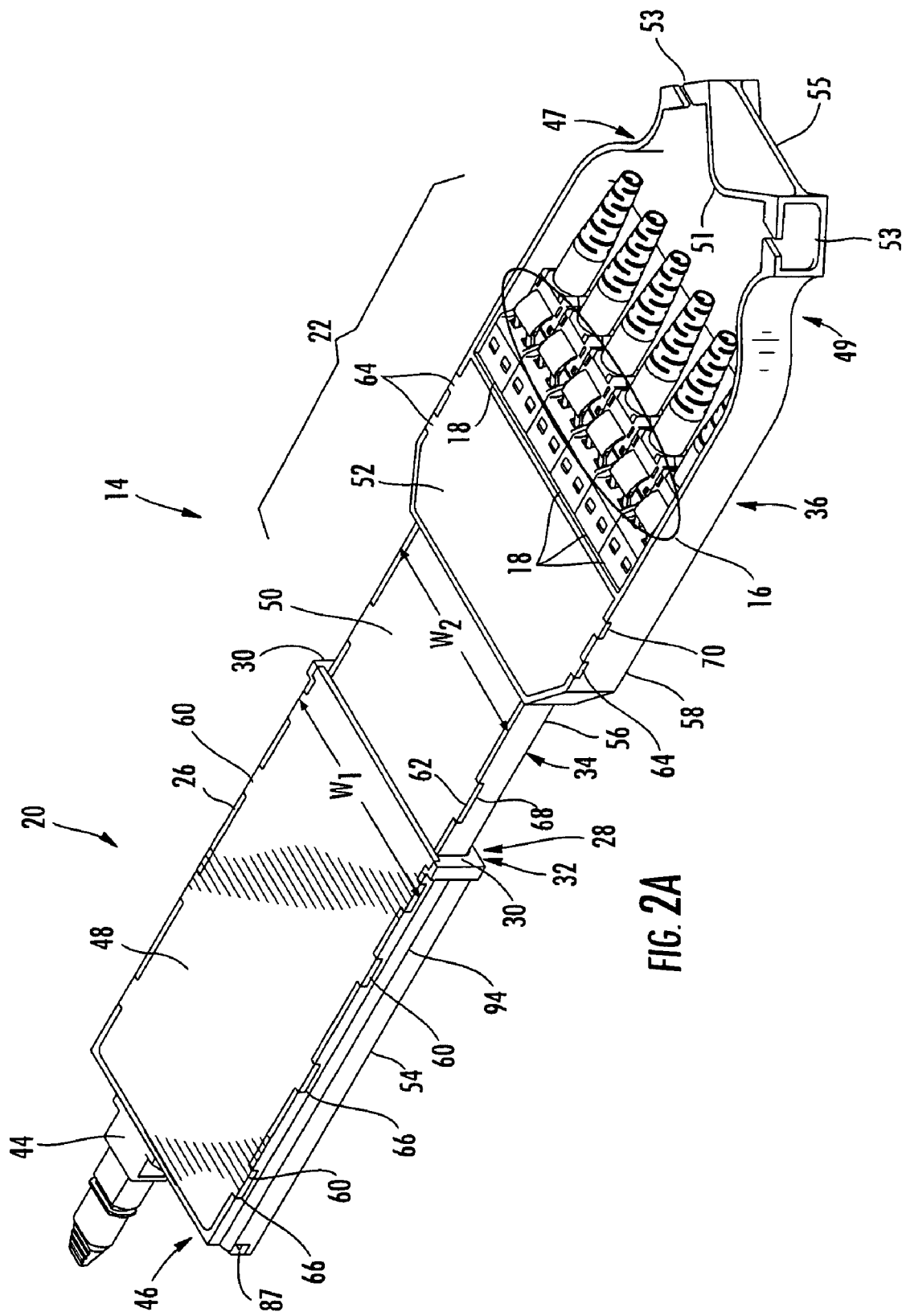
FIG. 2A is a front perspective view of a telescoping fiber optic module of FIG. 1 shown telescoped outward and removed from the fiber optic equipment chassis.
Figure 2B:
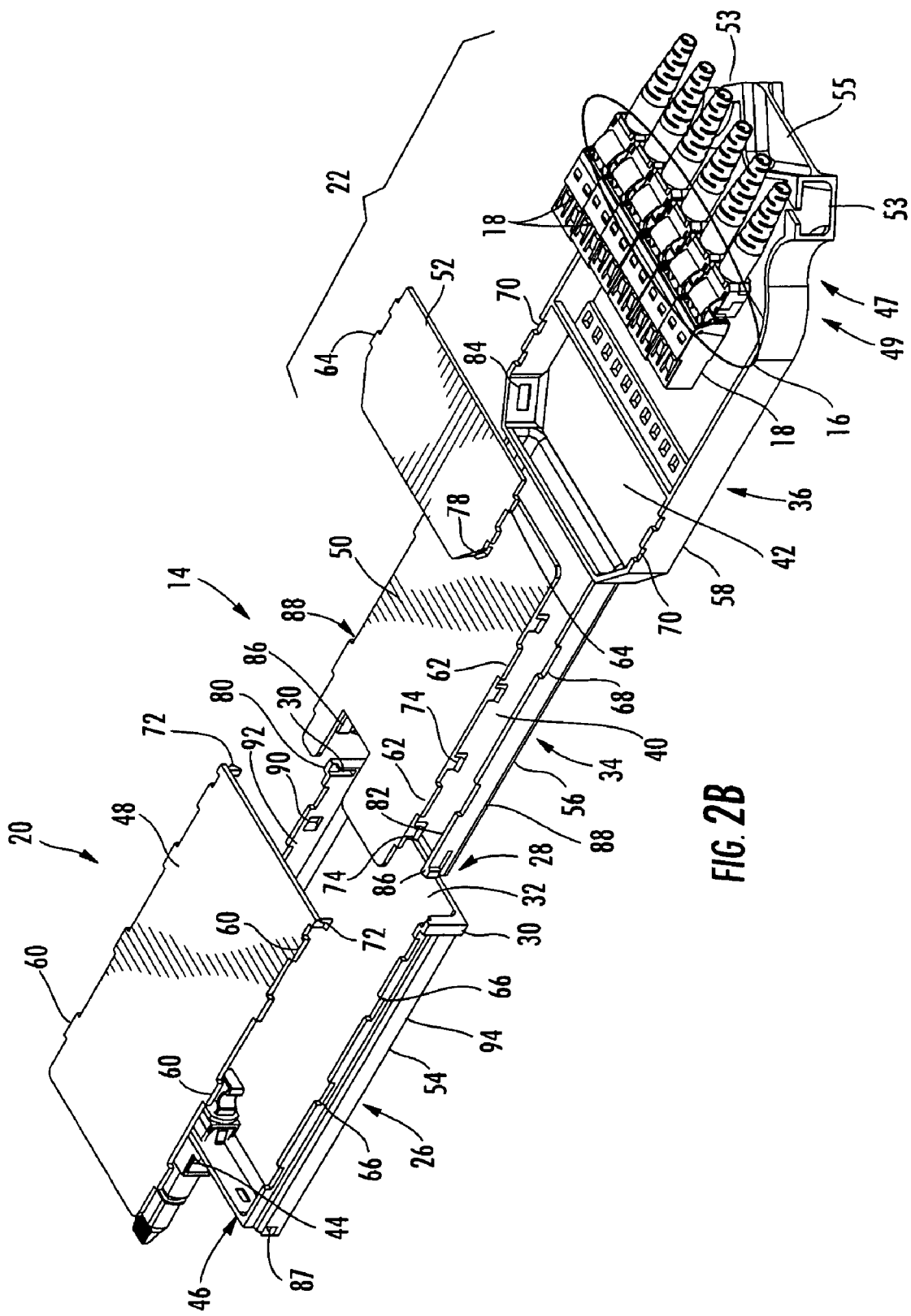
FIG. 2B is a front perspective exploded view of the telescoping fiber optic module of FIG. 2A.

FIGS. 2A and 2B illustrate the telescoping fiber optic module 14 of FIG. 1 to further illustrate the features and telescoping components. The telescoping fiber optic module 14 in FIG. 2A is illustrated in a telescoped or expanded orientation like the telescoping fiber optic module 14' telescoped out from the chassis 12 in FIG. 1. The telescoping fiber optic module 14 comprises a fixed housing portion 20 and a telescoping portion 22. As illustrated in FIGS. 2A and 2B, the fixed housing portion 20 is comprised of a housing 26 that has an opening 28 on a front side 30 of the housing 26. The opening 28 defines a passage 32 (FIG. 2B) inside the fixed housing portion 20 that is configured to receive the telescoping portion 22. More specifically, in this embodiment, a rear section 34 of the telescoping portion 22 is disposed inside the opening 28 and can translate in and out of the passage 32 defined by the opening 28. The fixed housing portion 20 is designed to remain in a fixed position when installed while the telescoping portion 22 can telescope in and out of the passage 32 of the fixed housing portion 20. The inner width $W_1$ of the passage 32 is slightly larger than the outer width $W_2$ of the rear section 34 such that the rear section 34 fits securely inside the passage 32 while being able to translate in and out of the passage 32.

The telescoping portion 22 also contains a front section 36 that is fixedly attached to the rear section 34 and is configured to receive fiber optic connections such as adaptors and/or connectors. More specifically, as illustrated in FIG. 2B, the front section 36 is configured to support the fiber optic adapters 18 that support connections to the fiber optic connectors 16. A cable harness (not shown) is placed inside the passage 32 and extended between the passage 32 through passages 40, 42 disposed in the rear section 34 and the front section 36 of the telescoping portion 22. The cable harness establishes a pathway between a fiber optic adapter 44 disposed on a rear side 46 of the fixed housing portion 20 and the fiber optic adapters 18 disposed in the front section 36 of the telescoping housing portion 22. An optional routing tray 47 is disposed on a front end 49 in the front section 36 of the telescoping portion 22 to provide routing and management of optical fibers (not shown) connected to the fiber optic connectors 16. A bend radius 51 (FIG. 2A) is disposed in the routing tray 47 to prevent optical fibers from bending beyond a given bend radius. Fiber routing guides 53 are also disposed in the routing tray 47 to direct optical fibers out and away from the telescoping fiber optic module 14. The bend radius 51 of the routing tray 47 also forms a tab 55 in this embodiment that can be used to allow a technician to pull and translate the telescoping portion 22 of the telescoping fiber optic module 14 from the fixed housing portion 20.

After the cable harness is installed in the telescoping fiber optic module 14 during installation or after cleaning of fiber optic connectors, removable module covers 48, 50, 52 can be secured respectively to a fixed housing 54, a rear section housing 56, and a front section housing 58. The removable module covers 48, 50, 52 secure and protect the cable harness and its fiber optic connectors (not shown) from dust and debris as well as to provide structural integrity to the telescoping fiber optic module 14. The removable module covers 48, 50, 52 may include protrusions 60, 62, 64 configured to mate inside indentions 66, 68, 70 disposed in the fixed housing 54, the rear section housing 56, and the front section housing 58, respectively, when installed. As shown in this embodiment, the removable module covers 48, 50, 52 are secured to the housings 54, 56, 58 via latches 72, 74, 78 disposed in the removable module covers 48, 50, 52 that latch or snap into latch receivers 80, 82, 84 respectively disposed in the fixed housing 54, rear section housing 56, and front section housing 58.

As will be discussed below with regard to FIG. 4, rails 94 are also disposed on each side of the fixed housing portion 20 to facilitate attachment to the chassis 12. Forward biased latches 86 are disposed in side walls 88 of the rear section 34 that engage with latch orifices 90 disposed in side wall 92 of the fixed housing portion 20 to prevent the rear section 34 from telescoping out completely from the fixed housing portion 20. The forward biased latches 86 are also configured to lock into latch orifices 87 disposed on each side of the rear side 46 of the fixed housing portion 20 to lock the rear section 34 of the telescoping portion 22 in place when the telescoping portion 22 is fully retracted into the fixed housing portion 20, as illustrated in FIG. 3.

Figure 3:
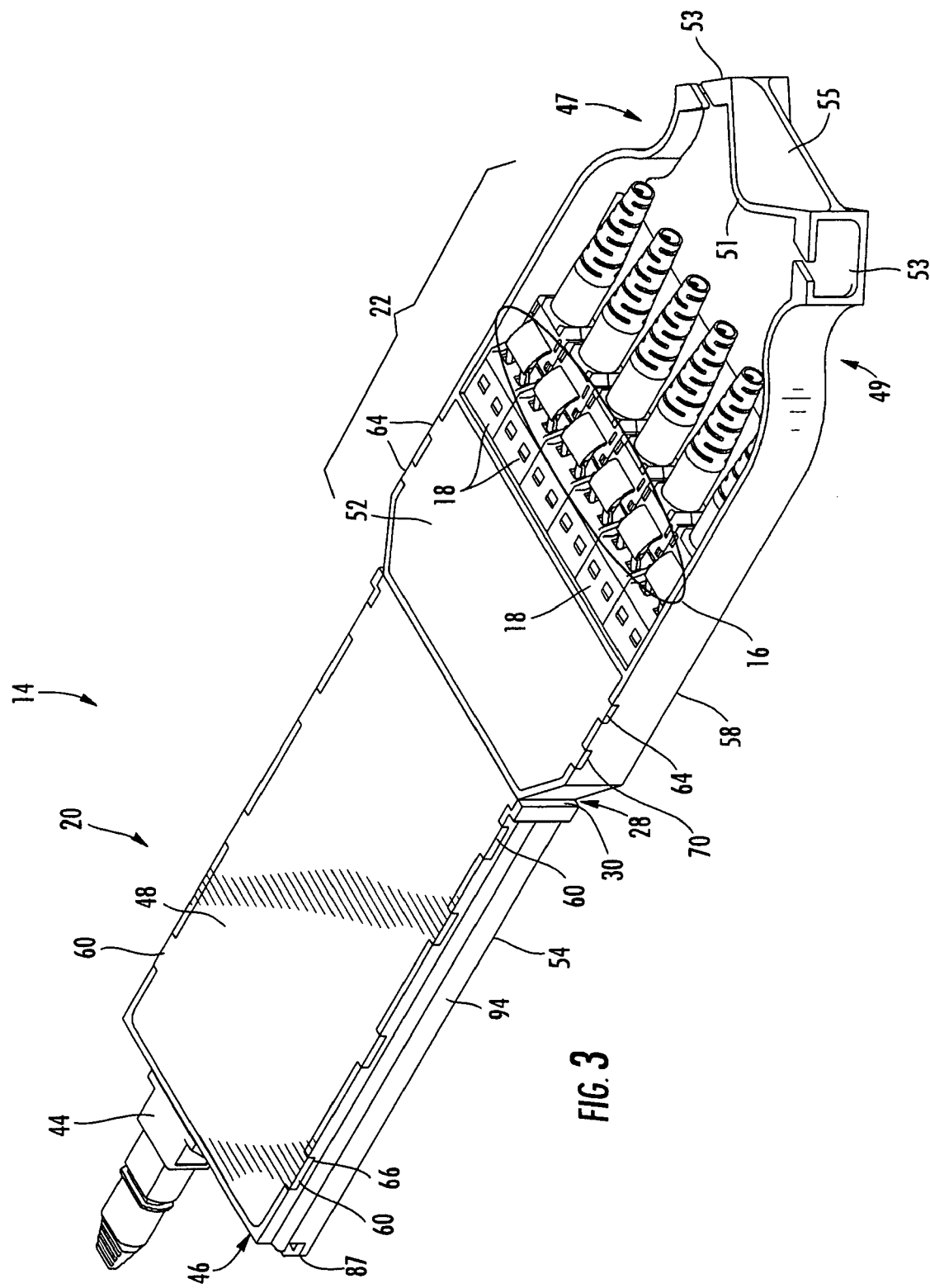
FIG. 3 is a front perspective view of the telescoping fiber optic module of FIG. 2A in a retracted position.

FIG. 3 illustrates the telescoping fiber optic module 14 with the telescoping portion 22 retracted fully into the fixed housing portion 20. As illustrated, the rear section 34 of the telescoping portion 22 is fully disposed inside the passage 32 of the fixed housing portion 20. The fixed housing portion 20 does not move within the chassis 12 during translation of the telescoping portion 22. After any desired access of the telescoping fiber optic module 14 and fiber optic connections 16 contained therein is accomplished and the purpose completed, the telescoping fiber optic module 14 is typically translated back into the fixed housing portion 20 as illustrated in FIG. 3.

Figure 4:
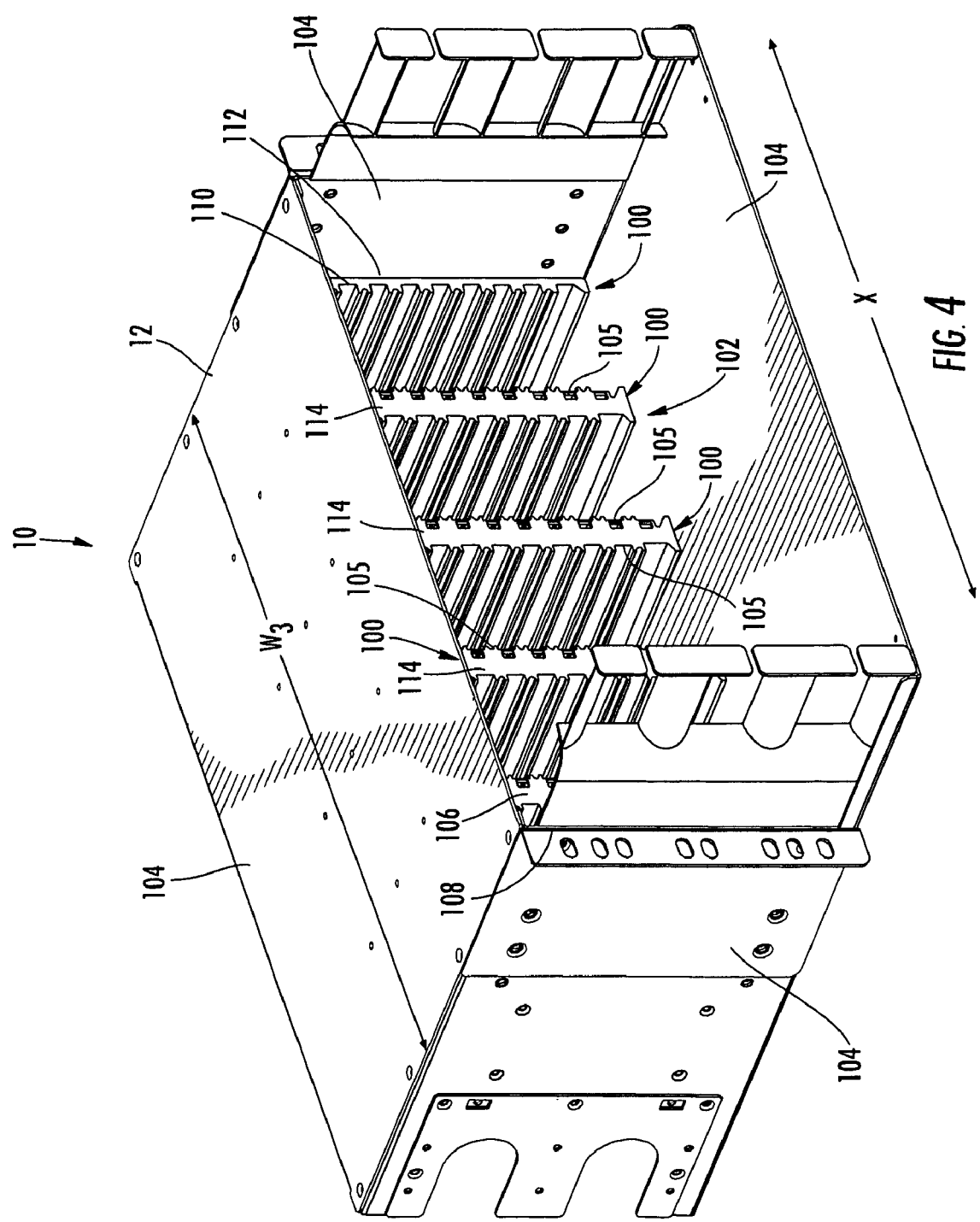
FIG. 4 is a front perspective view of the fiber optic equipment chassis of FIG. 1 without telescoping fiber optic modules loaded therein.

FIG. 4 illustrates a front perspective view of the chassis 12 of FIG. 1 without telescoping fiber optic modules 14 installed to explain how the fixed housing portion 20 of a telescoping fiber optic module 14 is installed in the chassis 12 in this embodiment. As illustrated, rail guides 100 are disposed inside an internal chamber 102 formed by outer walls 104 of the chassis 12. The rail guides 100 are configured to receive the rails 94 of the fixed housing portions 20 of the telescoping fiber optic modules 14 so that the fixed housing portions 20 preferably remain fixed to the chassis 12 even when the telescoping portion 22 is translated. The rail guides 100 contain a series of elongated indentions 105 configured to receive the rails 94 of the fixed housing portions 20. In this embodiment, a first rail guide system 106 is disposed on a first side 108 of the chassis 12 and a second rail guide system 110 is disposed on a second side 112 of the chassis 12. A rail guide system is a rail guide that contains a series of elongated indentions 105 to support more than one rail 94. With this configuration, one or more telescoping fiber optic modules 14 having a width spanning the entire width $W_3$ of the chassis 12 could be supported by and between the first rail guide system 106 and the second rail guide system 110. However, in this embodiment, intermediate rail guide systems 114 are also provided and disposed in the chassis 12 between the first rail guide system 106 and the second rail guide system 110. In this manner, more than one telescoping fiber optic module 14 may be installed in the chassis 12 along the horizontal or x-axis direction. Also in this embodiment, because the telescoping portion 22 provides a front section 36 that does not extend into the fixed housing portion 20 disposed between the rail guides 100 when installed, additional room is provided for fiber optic adapters 18 in the horizontal or x-axis direction. If the front section 36 of the telescoping portion 22 were not provided or such telescoped back into the fixed housing portion 20, less space would be available for fiber optic adapters 18 due to the space consumed by the rail guides 100. In this embodiment, this arrangement allows for five (5) telescoping fiber optic modules 14 to be placed in the horizontal or x-axis direction instead of four (4), but any suitable number of rows and/or columns are possible.

Figure 5A:
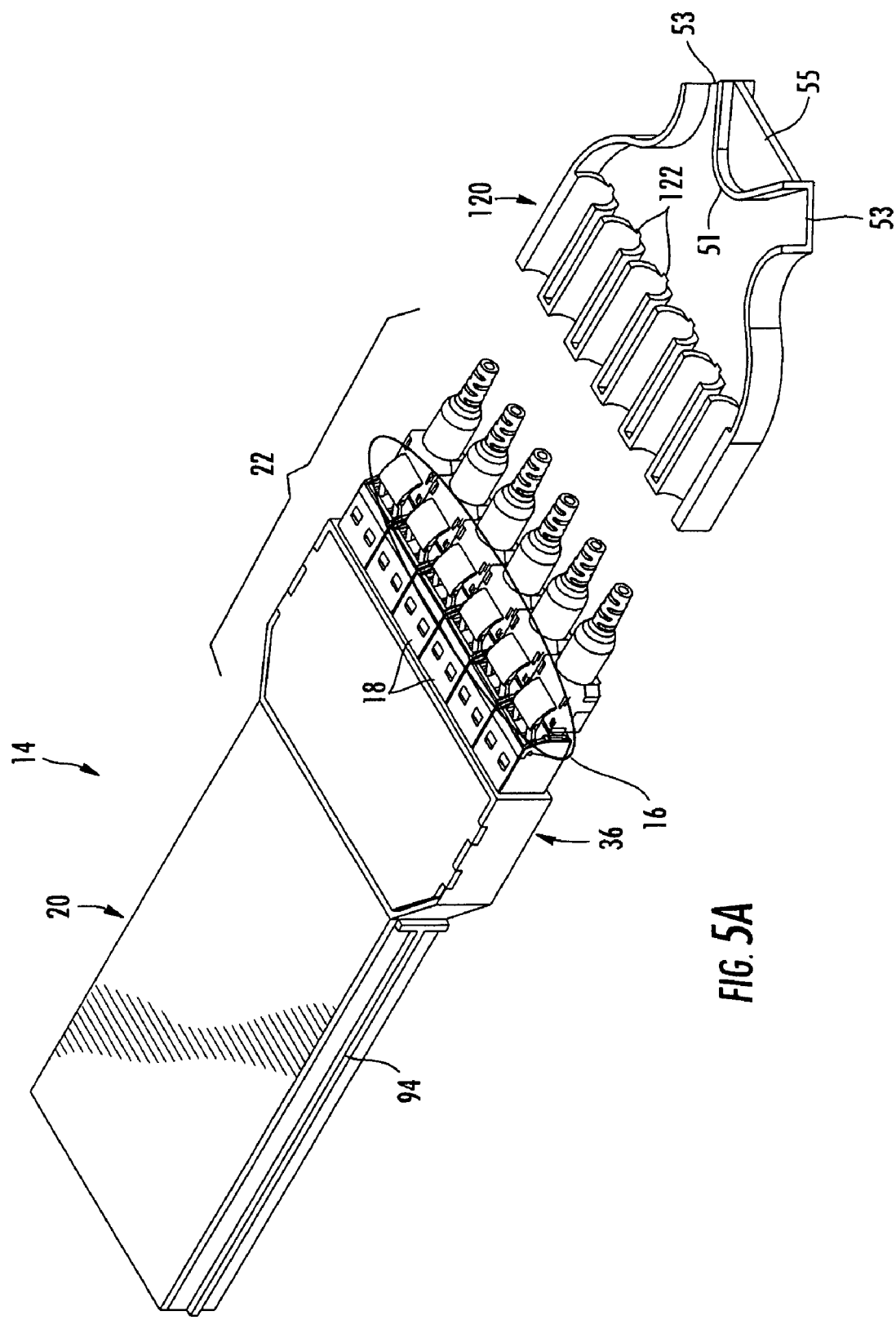
FIGS. 5A and 5B illustrate front perspective views of another exemplary embodiment of the telescoping fiber optic module of FIGS. 2A and 2B having a detachable fiber optic routing tray detached and attached in the respective views.
Figure 5B:
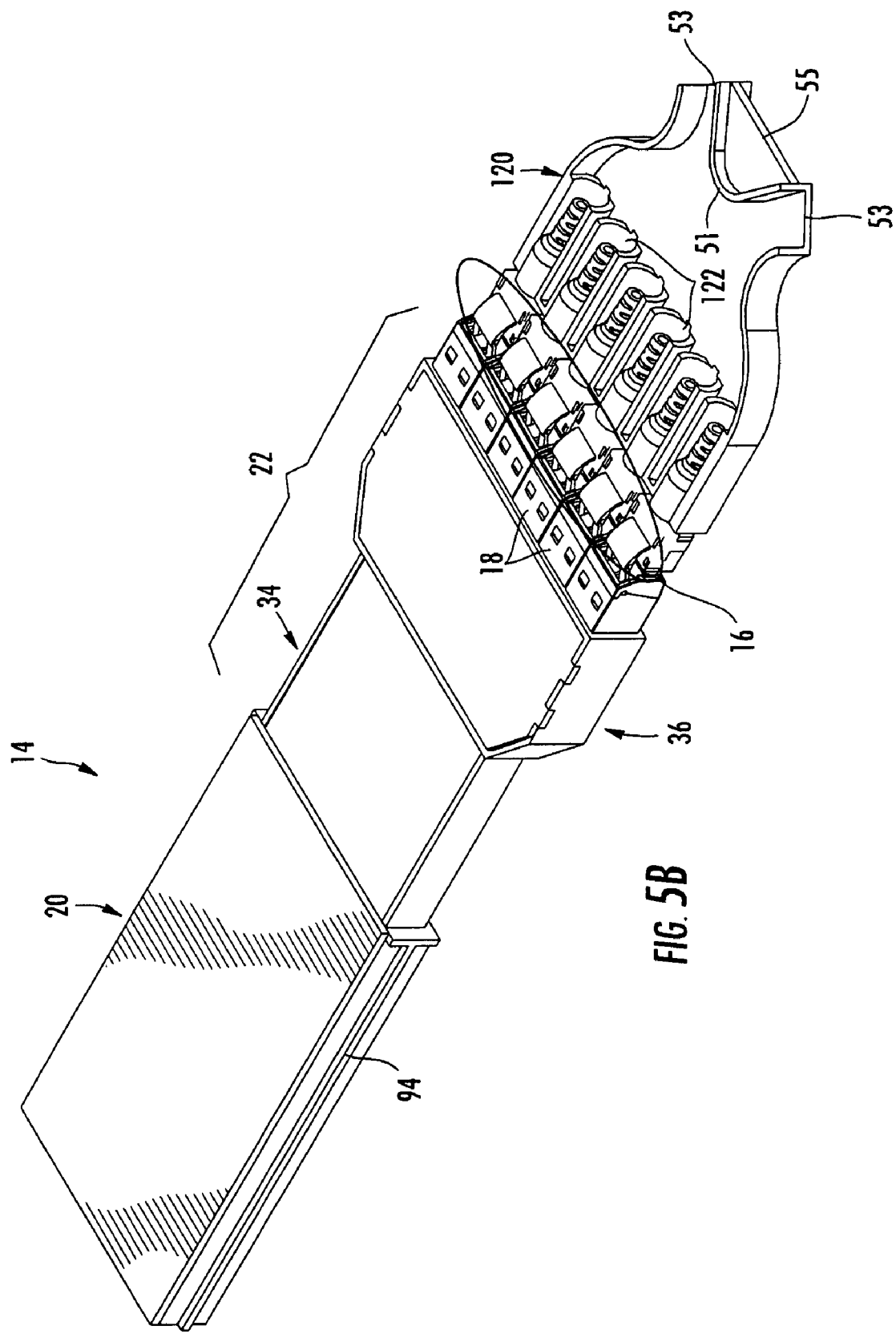

FIGS. 5A and 5B illustrate an alternative embodiment of the telescoping fiber optic module 14. In this embodiment, a detachable routing tray 120 is provided that is not part of the front section 36 of the telescoping portion 22 like the telescoping fiber optic module 14 illustrates in FIGS. 2A-3. Instead, the detachable routing tray 120 is provided as a separate component than can be attached to the fiber optic connectors 16 within fiber optic adapters 18 disposed in the front section 36. Providing a detachable routing tray 120 may provide enhanced access to the fiber optic connectors 16 for establishing and modifying connections or cleaning the fiber optic adapters 18 whether the telescoping portion 22 is telescoped out of the fixed housing portion 20 or not. The detachable routing tray 120 contains a series of channels 122 arranged in a generally parallel arrangement, each adapted to receive a fiber optic connector 16 as illustrated in FIG. 5B. The inner diameter of the channels 122 may be provided to have a slightly greater diameter than the outer diameter of the fiber optic connectors 16 so that the fiber optic connectors 16 fit inside the channels 122 while providing enough friction between the two for the detachable routing tray 120 to remain secured to the fiber optic connectors 16.

Figure 6A:
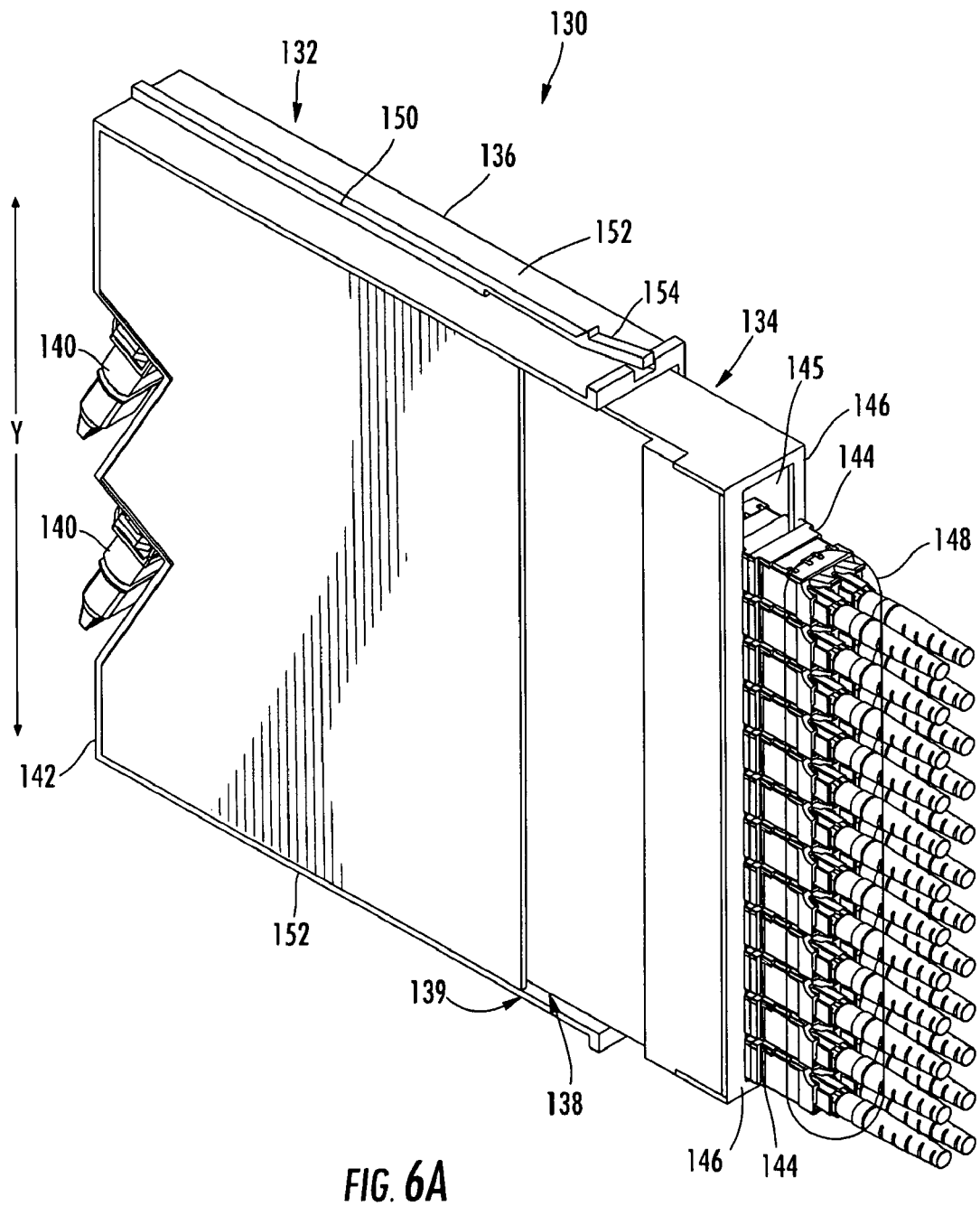
FIG. 6A is a front perspective view of another exemplary telescoping fiber optic module in an extended position.
Figure 6B:
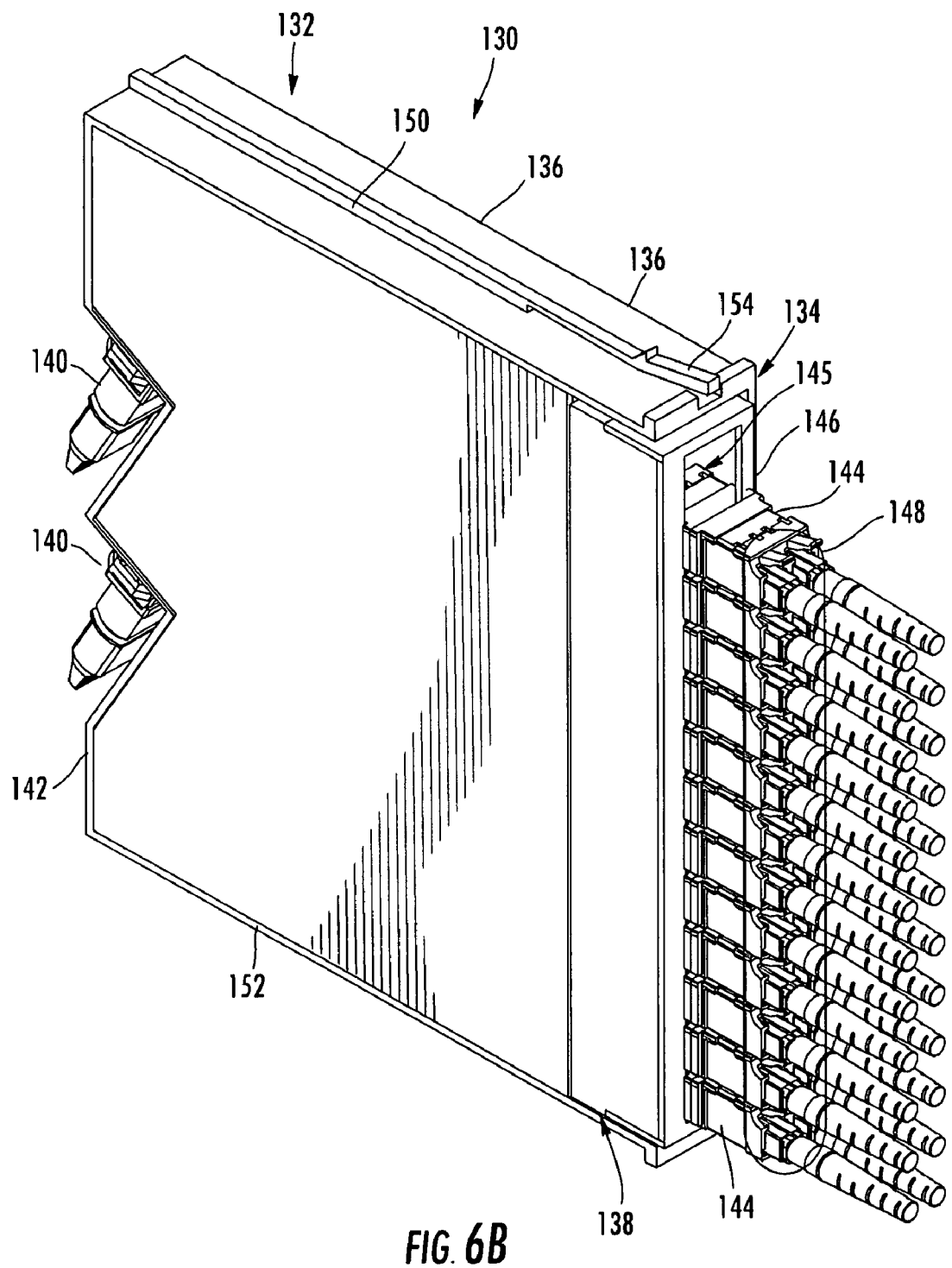
FIG. 6B is a front perspective view of the telescoping fiber optic module of FIG. 6A in a retracted position.

FIGS. 6A and 6B are front perspective views of another explanatory telescoping fiber optic module 130 for use in a fiber optic equipment chassis or other suitable location. In this embodiment, the telescoping fiber optic module 130 is provided in a vertical or y-axis orientation as opposed to a horizontal or x-axis orientation. However, the telescoping fiber optic module 130 could be arranged in a chassis in a horizontal or x-axis direction if the chassis is designed to receive the telescoping fiber optic module 130 in this orientation. FIG. 6A illustrates the telescoping fiber optic module 130 in an extended or telescoped out position. FIG. 6B illustrates the telescoping fiber optic module 130 in a retracted or telescoped in position. As illustrated in FIGS. 6A and 6B, the telescoping fiber optic module 130 comprises a fixed housing portion 132 and a telescoping portion 134 similar to the fiber optic telescoping module 14 of FIGS. 1-5B. The fixed housing portion 132 is configured to be fixedly attached inside a chassis where the telescoping portion 134 is configured to be able to telescope in and out of the fixed housing portion 132. The fixed housing portion 132 comprises a housing 136 defining an opening 138 that provides a passage 139 to receive the telescoping portion 134.

Figure 7:
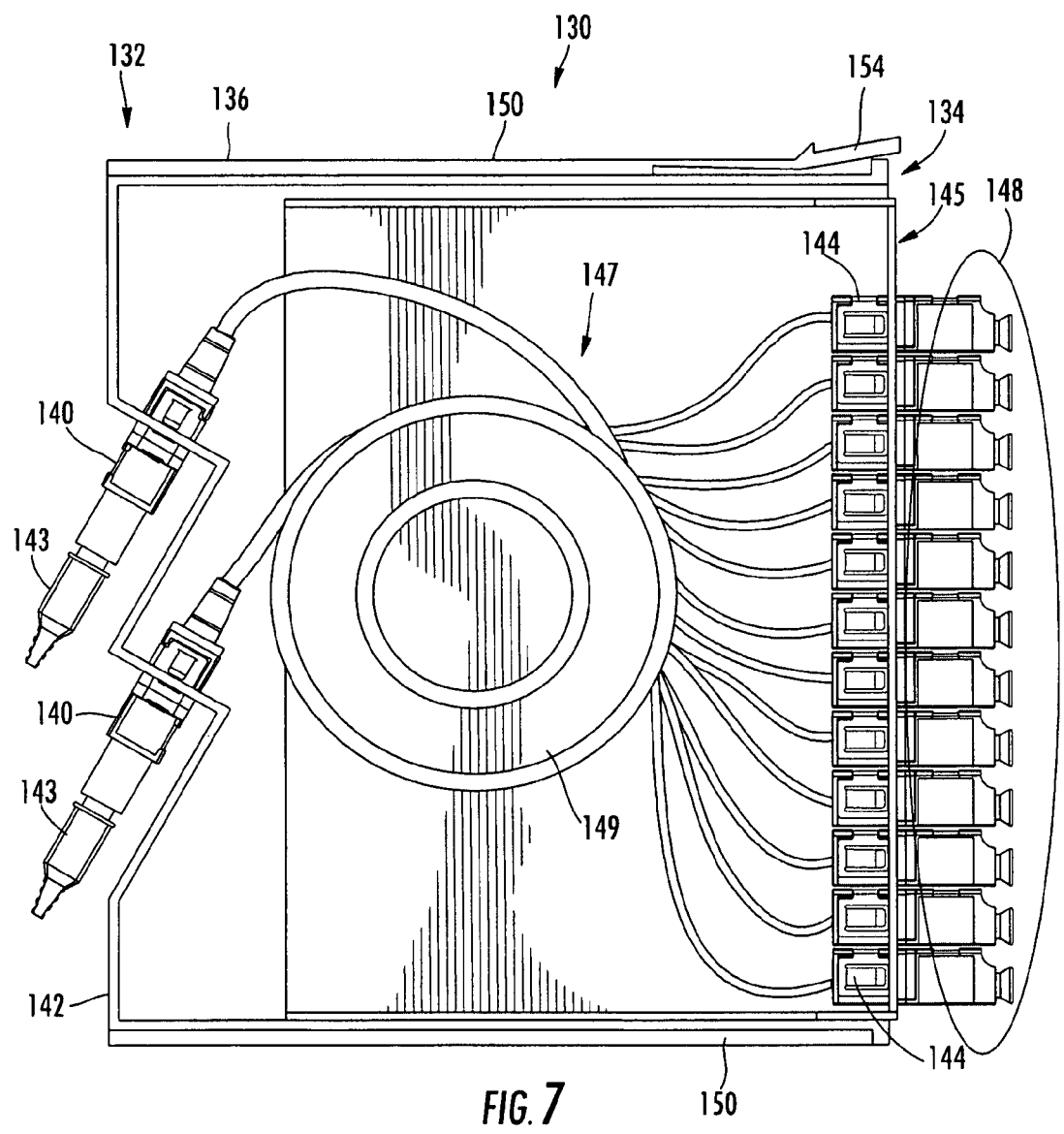
FIG. 7 is a top view of the telescoping fiber optic module of FIGS. 6A and 6B with the module cover removed to illustrate a cable harness contained inside the telescoping fiber optic module.

Fiber optic adapters 140 extend through a rear side 142 of the housing 136 to receive connectors of trunk cables 143 as illustrated in FIG. 7 for establishing fiber optic connectivity with fiber optic adapters 144 disposed through an opening 145 in a front side 146 of the telescoping portion 134. Fiber optic connectors 148 can be connected to the fiber optic adapters 144 via a connectorized cable harness 147 (FIG. 7) to establish fiber optic connections with optical fibers contained in the trunk cables 143 connected to the fiber optic adapters 140 in the fixed housing portion 132. To provide cable management inside the telescoping fiber optic module 130, a fiber spool 149 may be provided inside the fixed housing portion 132 as illustrated in FIG. 7. The cable harness 147 can be routed around the fiber spool 149 to provide slack management and so that the cable harness 147 can extend in length to allow the telescoping portion 134 to telescope out from the fixed housing portion 132 without affecting the connections to the fiber optic adapters 144. Alternatively, the fiber spool 149 could be a fiber routing guide where the cable harness 147 is routed to prevent the cable harness 147 from bending or kinking beyond a designed bend radius.

Figure 8:
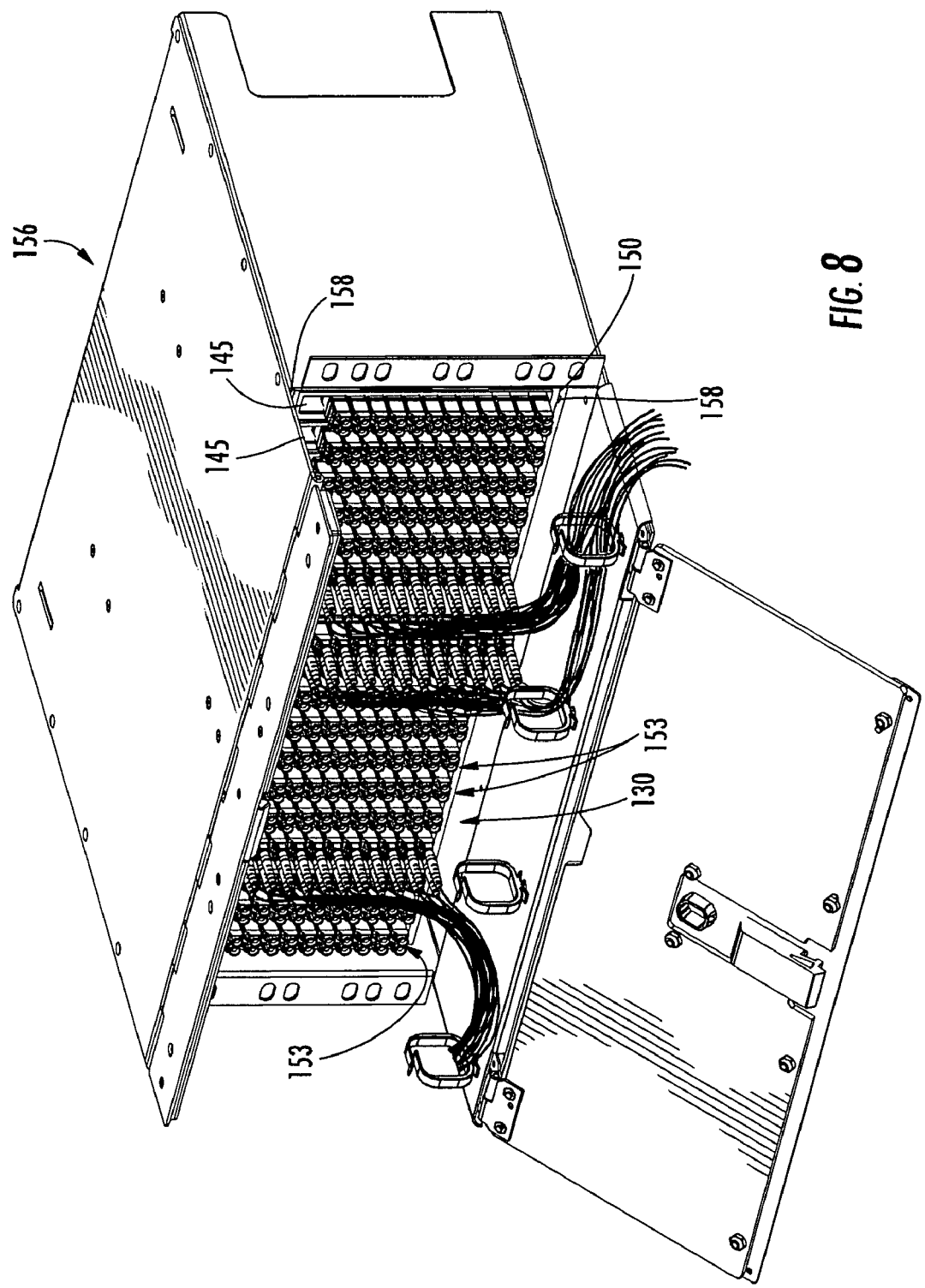
FIG. 8 is a front perspective view of another explanatory fiber optic equipment chassis holding telescoping fiber optic modules like those illustrated in FIGS. 6A and 6B.

As illustrated in FIGS. 6A-7, rails 150 are also disposed on each side 152 of the housing 136 of the fixed housing portion 132. Similar to the rails 94 provided in the telescoping fiber optic module 14 in FIGS. 1-5B, the rails 150 in the telescoping fiber optic module 130 of FIGS. 6A-7 facilitate attachment of the fixed housing portion 132 to a slot 153 in a chassis 156, as illustrated in FIG. 8. Each slot 153 in the chassis 156 contains rail guides 158 disposed inside the chassis 156 in the top and bottom of the slot 153 to receive the rails 150 and thus the fixed housing portion 132. A latch 154 is also disposed in one of the rails 150 of the housing 136 (FIG. 7) and is configured to engage with a latch receiver (not shown) disposed in a slot 153 in the chassis 156 (FIG. 8) when installed to lock the fixed housing portion 132 in place. The latches 154 can be released in the event that the fixed housing portion 132 needs to be removed from a chassis for any reasons, such as for repair or replacement as examples.

Figure 9:
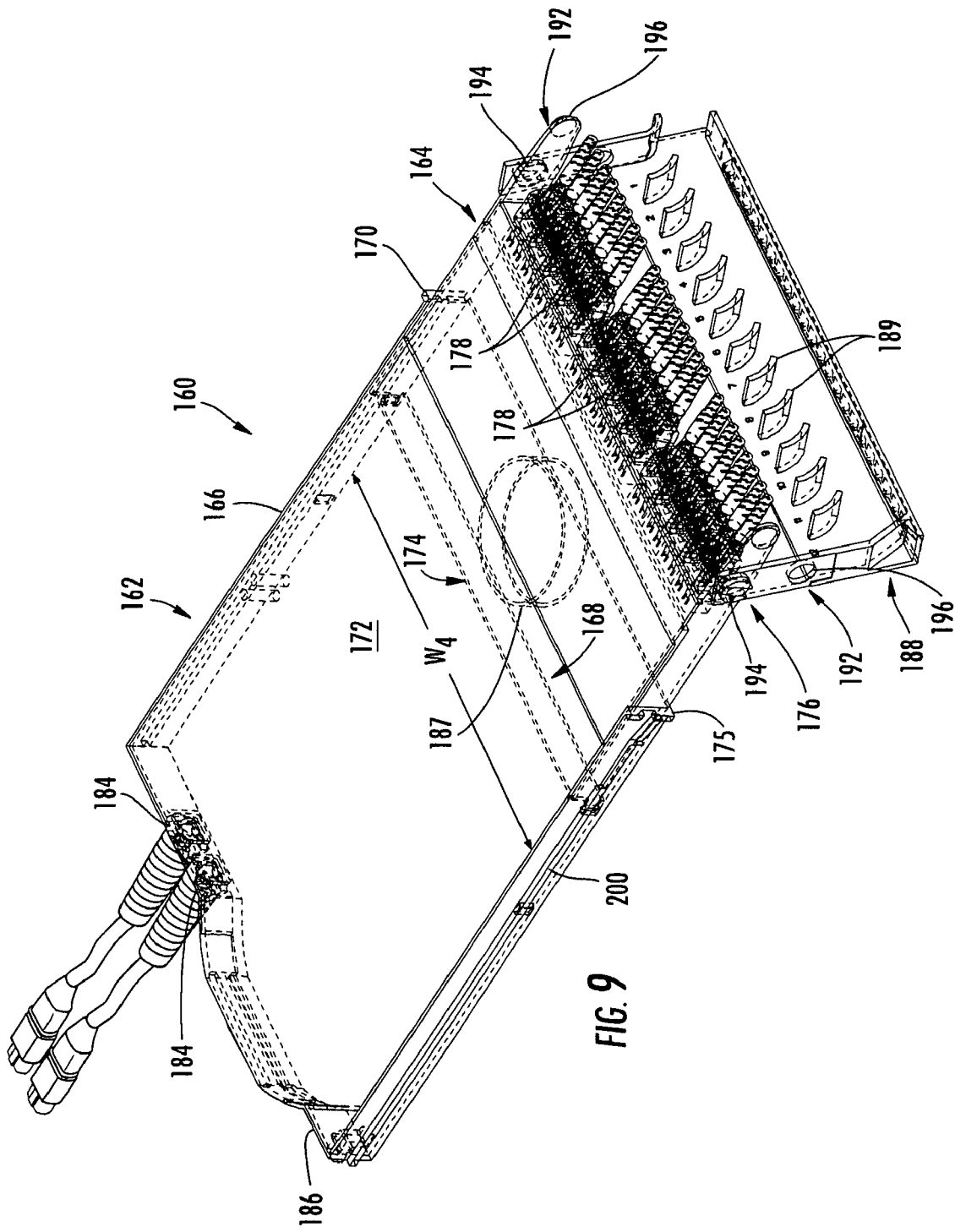
FIG. 9 is a front perspective view of another telescoping fiber optic module in an extended position.
Figure 10:
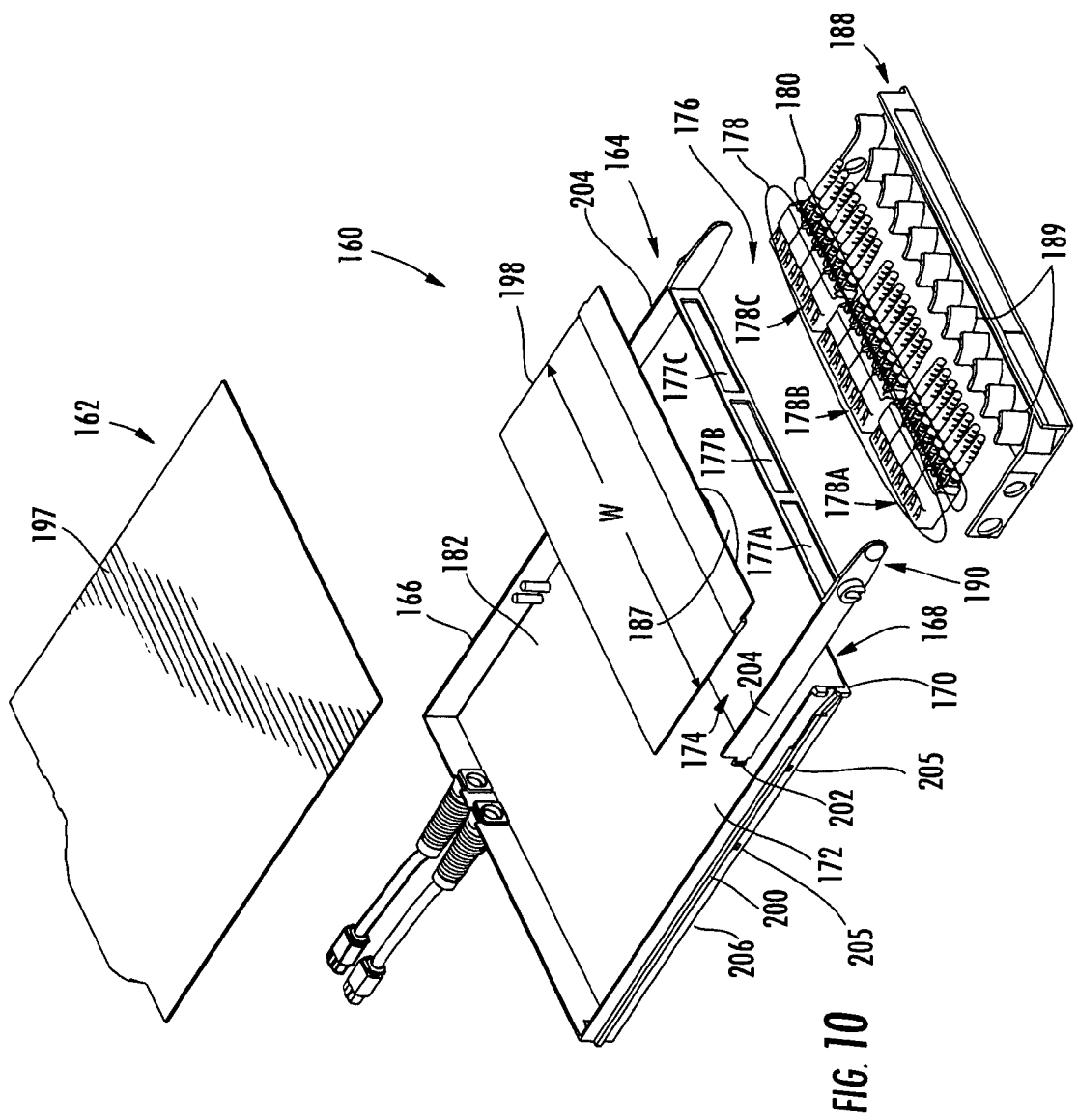
FIG. 10 is a front perspective exploded view of the fiber optic module of FIG. 9.

FIG. 9 illustrates yet another embodiment of a telescoping fiber optic module 160 that may be installed in a chassis or other location. FIG. 10 illustrates an exploded view of the components of the telescoping fiber optic module 160 of FIG. 9. The telescoping fiber optic module 160 in FIG. 9 is illustrated in a telescoped (i.e., extended) orientation. The telescoping fiber optic module 160 comprises a fixed housing portion 162 and a telescoping portion 164. As illustrated in FIGS. 9 and 10, the fixed housing portion 162 is comprised of a housing 166 that has an opening 168 on a front side 170 of the housing 166. The opening 168 defines a passage 172 inside the fixed housing portion 162 that is configured to receive the telescoping portion 164. More specifically, in this embodiment, a rear section 174 of the telescoping portion 164 is disposed inside the opening 168 and can translate in and out of the passage 172 defined by the opening 168. The inner width $W_4$ of the passage 172 is slightly larger than the outer width $W_5$ of the rear section 174 (as illustrated in FIG. 10) such that the rear section 174 fits securely inside the passage 172 while being able to translate in and out of the passage 172.

As illustrated in FIG. 10, a front section 176 of the telescoping portion 164 is configured to support fiber optic adapters 178 that support connections to fiber optic connectors 180. In this embodiment, the front section 176 contains three openings 177A, 177B, 177C to support three groupings of fiber optic adapters 178A, 178B, 178C. A cable harness (not shown) is placed inside the passage 172 and extended between the passage 172 through a passage 182 disposed in the fixed housing portion 162 to establish a connection between fiber optic adapters 184 disposed on a back side 186 of the fixed housing portion 162 and the fiber optic adapters 178 disposed in the telescoping portion 164 (FIG. 9). A bend radius control 187 may be provided in the passage 172 of the fixed housing portion 162 to control the bend radius of a cable harness located inside the passage 172. An optional routing tray 188 is disposed on a front end 190 (FIG. 10) in the telescoping portion 164 to provide routing of optical fibers (not shown) connected to the fiber optic connectors 180. Fiber guides 189 are disposed in the routing tray 188 to provide a bend radius and route connectorized optical fibers connected to the fiber optic connectors 180. The routing tray 188 is illustrated in FIG. 9 in a tilted position to provide enhanced access to the fiber optic adapters 178 and fiber optic connectors 180. A tilting mechanism 192 is provided wherein a fixed latch or fastener 194 fixedly holds the routing tray 188 to the front end 190 of the telescoping portion 164 and a releasable latch or fastener 196 can be secured and unsecured from the front end 190 such that the routing tray 188 can tilt about the fixed latch or fastener 194.

After the cable harness is installed in the telescoping fiber optic module 160 during installation or after cleaning of fiber optic connections, removable module covers 197, 198 can be secured to the fixed housing portion 162 and the telescoping portion 164, respectively, to protect the optical fibers and connectors contained therein from dust and debris as well as to provide structural integrity to the telescoping fiber optic module 160. As will be discussed below with regard to FIGS. 11-14, rails 200 are also disposed on each side of the fixed housing portion 162 to facilitate attachment to a chassis. As illustrated in FIG. 10, rearward biased latches 202 are disposed in side walls 204 of the rear section 174 that engage with latch orifices 205 disposed in side wall 206 of the fixed housing portion 162 to define the limits for retraction and telescoping out of the telescoping portion 164 from the fixed housing portion 162.

Figure 11:
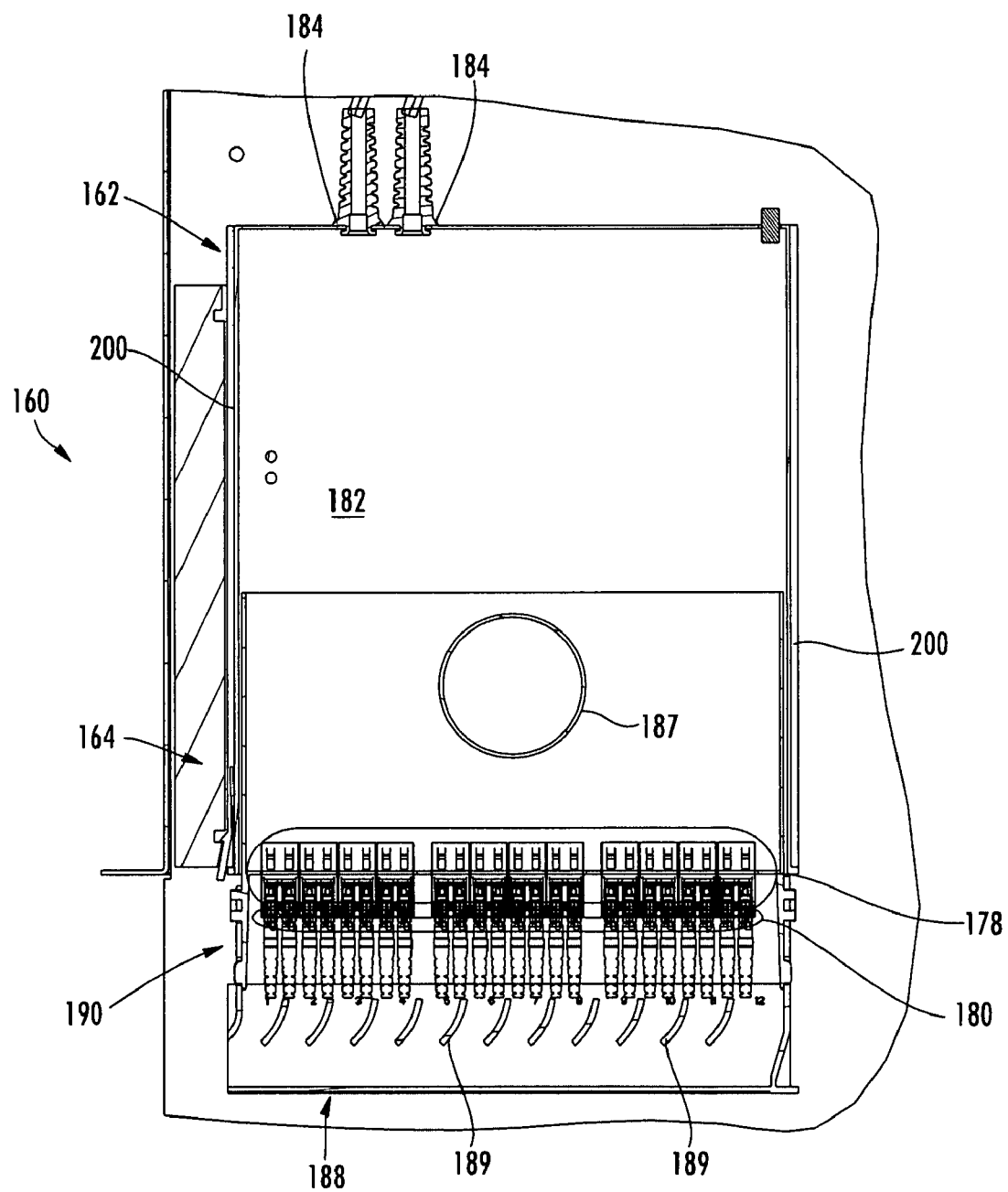
FIG. 11 is a top view of the telescoping fiber optic module of FIG. 9 in a retracted position and with the module cover removed.
Figure 12:
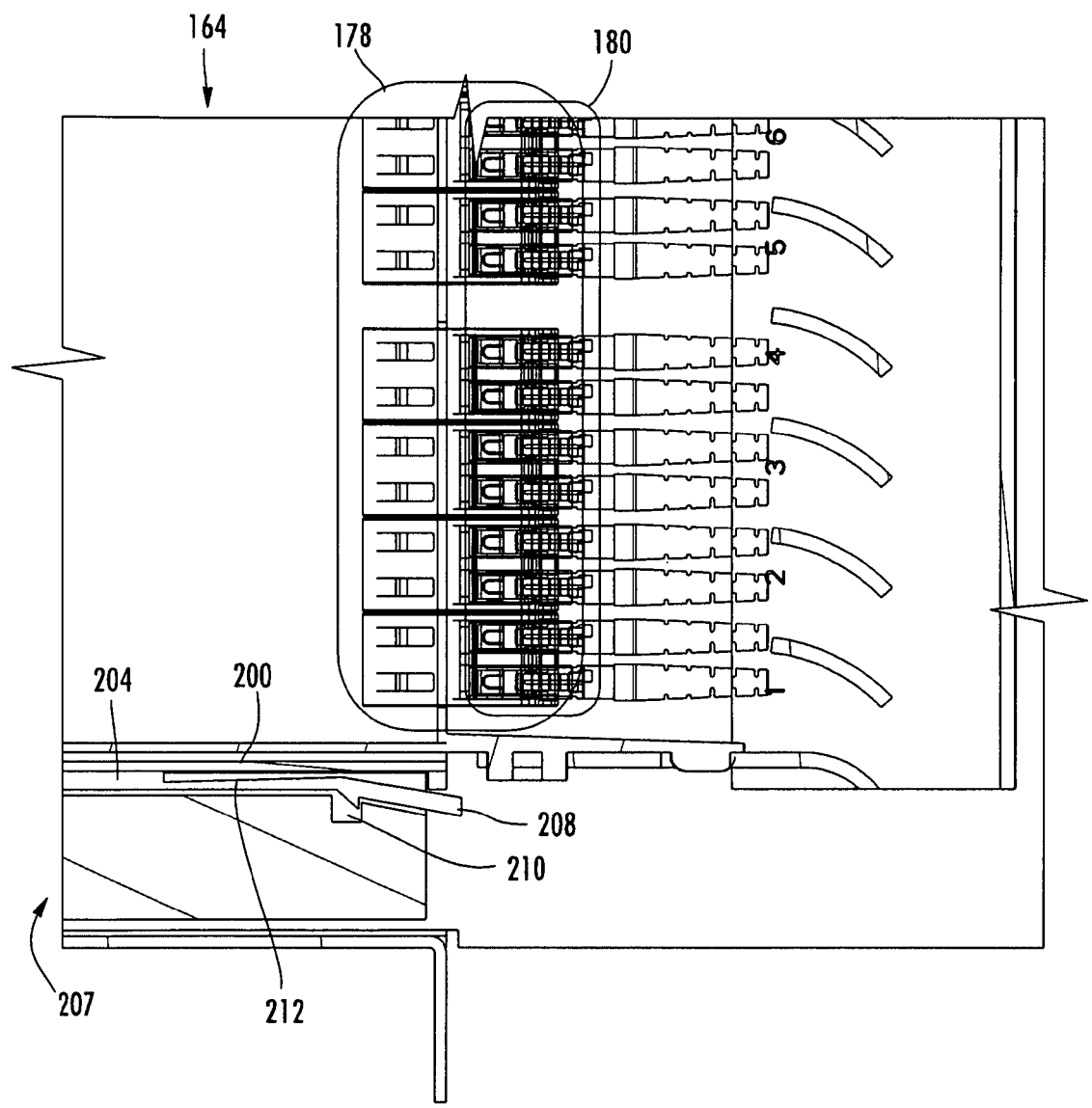
FIG. 12 is a close-up view of the front side of the telescoping fiber optic module and fiber optic connectors illustrated in FIG. 11.

FIG. 11 illustrates the telescoping fiber optic module 160 with the telescoping portion 164 retracted or telescoped fully into the fixed housing portion 162. As illustrated, the telescoping portion 164 is fully disposed inside the passage 182 of the fixed housing portion 162. The fixed housing portion 162 does not move within a chassis during translation of the telescoping portion 164. After any desired access of the telescoping fiber optic module 160 and fiber optic connections contained therein is accomplished and the purpose completed, the telescoping portion 164 is typically translated back into the fixed housing portion 162. FIG. 12 illustrates a close-up view of the front of the telescoping portion 164 in a telescoped out configuration to show the rails 200 and their relationship to a chassis 207 when the fixed housing portion 162 is installed and a rearward biased latch 208 configured to secure the fixed housing portion 162 to the chassis 207. As illustrated therein, the rearward biased latch 208 is engaged with an indention 210 disposed in a slot 212 in the chassis 207 to prevent the fixed housing portion 162 from being extended out from the chassis 207. However, the rearward biased latch 208 can be pushed inward to release it from the indention 210 if the fixed housing portion 162 needs to be removed. Note that although not shown in FIG. 12, the same rearward biased latch 208 and indention 210 configuration is provided on the opposite side of the telescoping fiber optic module 160.

Figure 13:
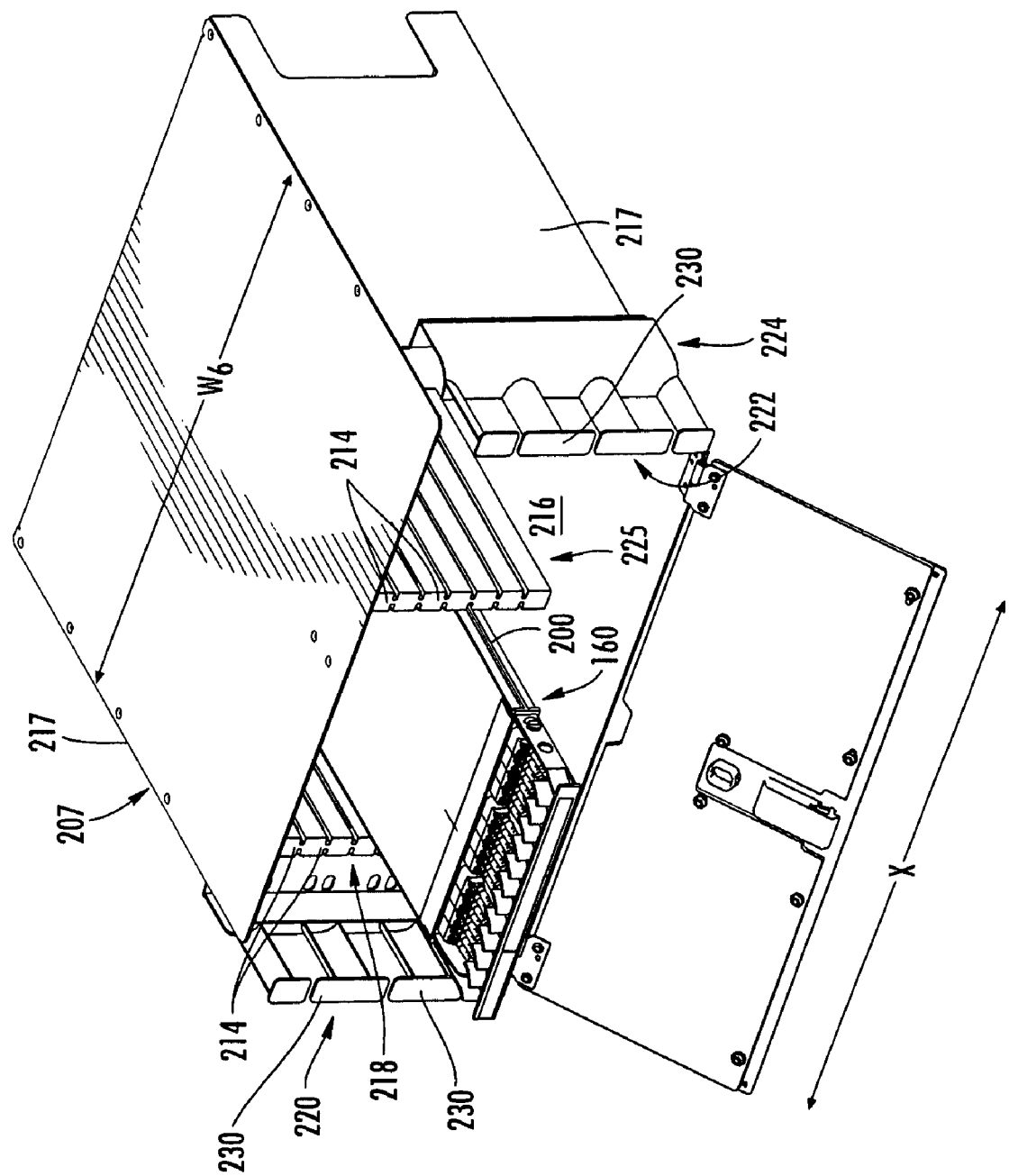
FIG. 13 is a front perspective view of another fiber optic equipment chassis holding telescoping fiber optic modules like those illustrated in FIG. 9.
Figure 14:
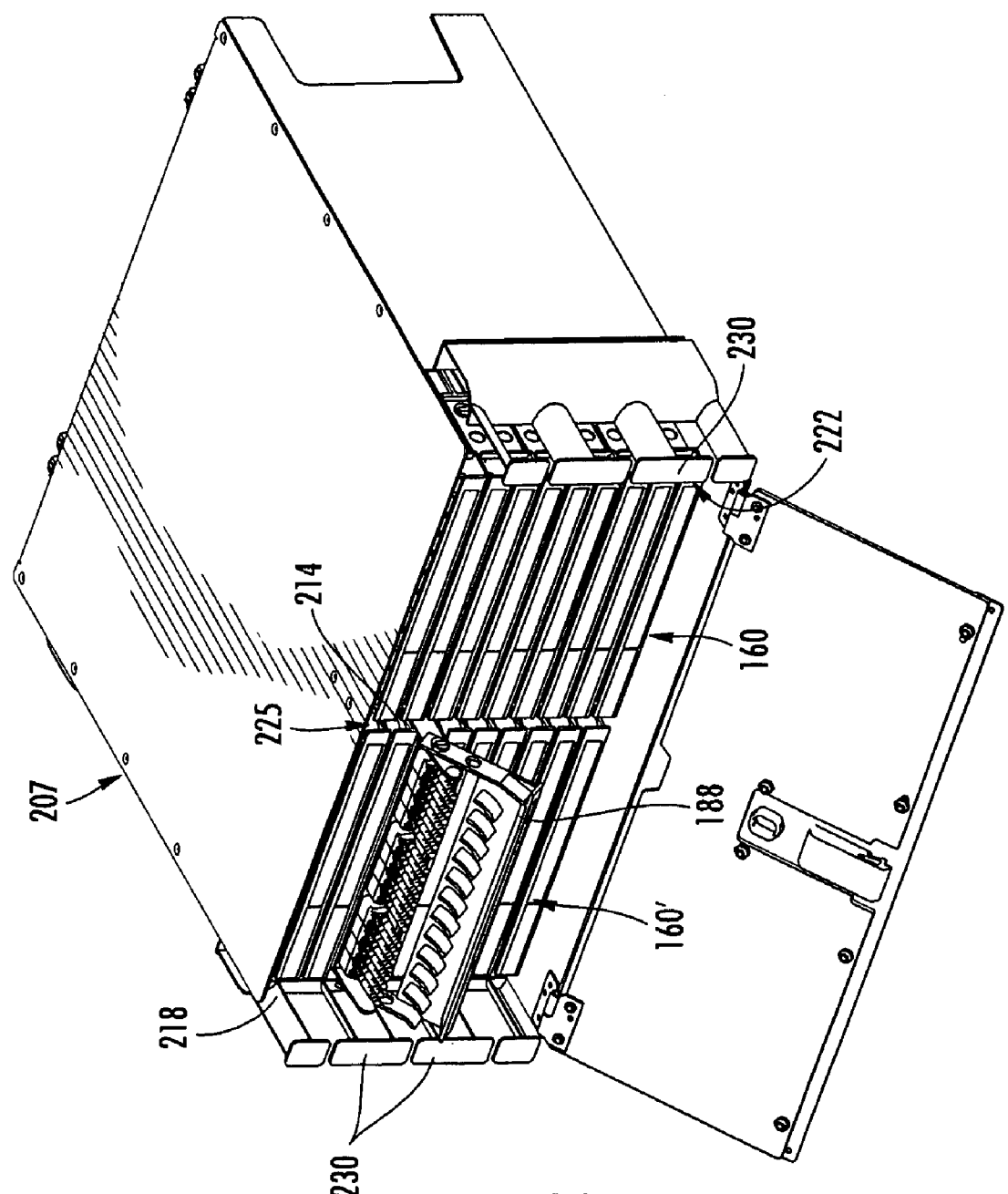
FIG. 14 is a front perspective view of the fiber optic equipment chassis in FIG. 13 with a telescoping fiber optic modules of FIG. 9 installed therein.

FIGS. 13 and 14 illustrate front perspective views of the chassis 207 with one or more telescoping fiber optic modules 160 installed to facilitate discussion of how the fixed housing portion 162 of the telescoping fiber optic module 160 is installed in the chassis 207. As illustrated in FIG. 13, rail guides 214 are disposed inside an internal chamber 216 formed by outer walls 217 of the chassis 207. The rail guides 214 are configured to receive the rails 200 of the fixed housing portions 162 of telescoping fiber optic modules 160 so that the fixed housing portions 162 remain fixed to the chassis 207 when installed even when the telescoping portions 164 are translated. The rail guides 214 contain a series of elongated indentions (not shown) configured to receive the rails 200 of the fixed housing portions 162. In this embodiment, a first rail guide system 218 is disposed on a first side 220 of the chassis 207 and a second rail guide system 222 is disposed on a second side 224 of the chassis 207. With this configuration, one or more telescoping fiber optic modules 160 having a width spanning or substantially spanning the entire width $W_6$ of the chassis 207 could be supported by and between the first rail guide system 218 and the second rail guide system 222. However, in this embodiment, an intermediate rail guide system 225 is also provided and disposed in the chassis 207 between the first rail guide system 218 and the second rail guide system 222. In this manner, more than one telescoping fiber optic module 160 may be installed in the chassis 207 along the horizontal or x-axis direction.

FIG. 14 illustrates a number of telescoping fiber optic modules 160 installed in the chassis 207 with one telescoping fiber optic module 160' telescoped out from the chassis 207 and its routing tray 188 tilted downward to provide access. The chassis 207 in FIGS. 13 and 14 may also contain one or more routing guides 230 that allow fiber optic cables connected to the fiber optic adapters 178 on the telescoping fiber optic module 160 to be routed away from the chassis 207 in an organized manner to other connections.

The fiber optic modules that are discussed herein encompass any type of fiber optic equipment. The fiber optic module may support fiber optic adapters, connectors, or any other type of fiber optic component or optical fiber components. Many modifications and other embodiments of the invention set forth herein will come to mind to one skilled in the art to which the invention pertains having the benefit of the teachings presented in the foregoing descriptions and the associated drawings. These modifications include, but are not limited to, the type of chassis, the configuration of the telescoping fiber optic module and whether the telescoping portion is comprised of one or more sections or portions, the type of fiber optic connectors and/or adapters provided in the telescoping fiber optic module and a cable harness contained therein, the number or density of fiber optic connections provided in the fiber optic telescoping module, whether a routing tray is provided, type of routing, whether universal or classic, etc.

Therefore, it is to be understood that the invention is not to be limited to the specific embodiments disclosed and that modifications and other embodiments are intended to be included within the scope of the appended claims. It is intended that the present invention cover the modifications and variations of this invention provided they come within the scope of the appended claims and their equivalents. Although specific terms are employed herein, they are used in a generic and descriptive sense only and not for purposes of limitation.

What is claimed is:

1. A fiber optic module, comprising:
    a fixed housing portion having an opening on a front side defining a passage inside the fixed housing portion, wherein the fixed housing portion includes a rear side opposite the front side that receives one or more rear side fiber optic adaptors that receive one or more fiber optic connectors or fiber optic connectors; and
    a telescoping portion received in the passage and configured to telescope outward to the front of the fiber optic module.

2. The fiber optic module of claim 1, wherein the telescoping portion is configured to receive one or more fiber optic adaptors or connectors.

3. The fiber optic module of claim 1, further comprising a cable harness disposed in the passage.

4. The fiber optic module of claim 1, further comprising at least one latching mechanism provided on the fixed housing portion configured to engage with the telescoping portion.

5. The fiber optic module of claim 4, wherein the at least one latching mechanism is disengaged to allow the telescoping portion to telescope out from the fixed housing portion.

6. The fiber optic module of claim 1, further comprising at least one latching mechanism provided on the fixed housing portion configured to engage with a fiber optic equipment chassis.

7. The fiber optic module of claim 1, wherein the telescoping portion further comprises:
    a front section configured to receive one or more fiber optic adaptors or connectors; and
    a rear section received in the passage that may telescope in and out of the passage.

8. The fiber optic module of claim 7, further comprising at least one latching mechanism disposed in the rear section configured to engage with the fixed housing portion.

9. The fiber optic module of claim 1, further comprising at least one rail disposed on the fixed housing portion.

10. The fiber optic module of claim 9, wherein the at least one rail is configured to be inserted into a rail guide disposed in a fiber optic equipment chassis to install the fiber optic module in the fiber optic equipment chassis.

11. The fiber optic module of claim 1, further comprising a removable cover.

12. The fiber optic module of claim 1, further comprising a cable routing guide or a slack management guide disposed in the passage inside the fixed housing portion.

13. The fiber optic module of claim 1, further comprising a routing tray attached to the telescoping portion.

14. The fiber optic module of claim 13, wherein the routing tray is tiltable about the telescoping portion.

15. A fiber optic apparatus, comprising:
a chassis comprised of one or more slots; and
one or more telescoping fiber optic modules each comprising:
a fixed housing portion contained in a slot among the one or more slots, wherein the fixed housing portion includes a rear side opposite the front side that receives one or more rear side fiber optic adaptors that receive one or more fiber optic connectors or fiber optic connectors; and
a telescoping portion received in the fixed housing portion and configured to telescope in and out of the fixed housing portion.

16. The fiber optic apparatus of claim 15, wherein the one or more telescoping fiber optic modules each contain at least one rail received into at least one rail guide disposed in the chassis.

17. The fiber optic apparatus of claim 15, further comprising:
a first rail guide system disposed on a first side of the chassis;
a second rail guide system disposed on a second side of the chassis;
a first rail disposed on a first side of each of the one or more telescoping fiber optic modules and received into the first rail guide system; and
a second rail disposed on a second side of each of the one or more telescoping fiber optic modules and received into the second rail guide system.

18. The fiber optic apparatus of claim 17, further comprising at least one intermediate rail guide system disposed in the chassis between the first rail guide system and the second rail guide system.

19. The fiber optic apparatus of claim 18, wherein at least one telescoping fiber optic module is received by a rail guide system formed by the first rail guide system and the at least one intermediate rail guide system; and
wherein another at least one telescoping fiber optic module is received by the rail guide system formed by the second rail guide system and the at least one intermediate rail guide system.

20. The fiber optic apparatus of claim 18, further comprising at least one rail guide disposed on each side of the at least one intermediate rail guide system.

21. A fiber optic apparatus, comprising:
a chassis comprised of at least five horizontally-arranged rows each having one or more vertically-arranged slots;
at least five telescoping fiber optic modules each configured to support at least twelve fiber optic connections and disposed across a rows among the at least five horizontally-arranged rows among the one or more slots, each of the at least five telescoping fiber optic modules comprising:
a fixed housing portion contained in a slot among the one or more slots, wherein the fixed housing portion includes a rear side opposite the front side that receives one or more rear side fiber optic adaptors that receive one or more fiber optic connectors or fiber optic connectors; and
a telescoping portion received in the fixed housing portion and configured to telescope in and out of the fixed housing portion.

22. The fiber optic apparatus of claim 21, further comprising a cable harness disposed in the passage.

23. The fiber optic apparatus of claim 21, wherein the telescoping portion is configured to receive one or more fiber optic adaptors or connectors.

24. The fiber optic apparatus of claim 21, further comprising at least one rail disposed on the fixed housing portion.

25. The fiber optic apparatus of claim 24, wherein the at least one rail is configured to be inserted into a rail guide disposed in the chassis to install the fiber optic module in the chassis.

26. The fiber optic apparatus of claim 21, further comprising a routing tray attached to the telescoping portion.

27. The fiber optic apparatus of claim 26, wherein the routing tray is tiltable about the telescoping portion.

* * * * *